(12) United States Patent
Garney et al.

(10) Patent No.: US 6,889,265 B2
(45) Date of Patent: May 3, 2005

(54) APPARATUS AND METHOD TO ALLOW AND SYNCHRONIZE SCHEDULE CHANGES IN A USB ENHANCED HOST CONTROLLER

(75) Inventors: John I. Garney, Portland, OR (US); Brian A. Leete, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 222 days.

(21) Appl. No.: 09/992,772

(22) Filed: Nov. 5, 2001

(65) Prior Publication Data

US 2003/0093588 A1 May 15, 2003

(51) Int. Cl.[7] .................. G06F 13/00; G06F 3/00; G06F 3/02
(52) U.S. Cl. .................. 710/18; 710/29; 710/30; 710/38; 710/58; 710/100; 710/105; 710/107; 710/129; 370/455
(58) Field of Search .................. 710/18, 29, 30, 710/58, 100, 105, 107, 129, 38; 370/455

(56) References Cited

U.S. PATENT DOCUMENTS

| | | | |
|---|---|---|---|
| 4,819,229 A | * 4/1989 | Pritty et al. | 370/455 |
| 5,291,614 A | 3/1994 | Baker et al. | |
| 5,594,882 A | 1/1997 | Bell | |
| 5,617,418 A | 4/1997 | Shirani et al. | |
| 5,694,555 A | 12/1997 | Morriss et al. | |
| 5,708,794 A | 1/1998 | Parks et al. | |
| 5,742,847 A | 4/1998 | Knoll et al. | |
| 5,819,111 A | * 10/1998 | Davies et al. | 710/29 |
| 5,838,991 A | * 11/1998 | Shipman | 710/18 |
| 5,870,567 A | 2/1999 | Hausauer et al. | |
| 5,890,015 A | 3/1999 | Garney et al. | |
| 6,034,950 A | 3/2000 | Sauer et al. | |
| 6,067,591 A | * 5/2000 | Howard et al. | 710/100 |
| 6,145,039 A | 11/2000 | Ajanovic et al. | |
| 6,205,501 B1 | 3/2001 | Brief et al. | |
| 6,272,499 B1 | 8/2001 | Wooten | |
| 6,389,029 B1 | 5/2002 | McAlear | |
| 6,483,839 B1 | 11/2002 | Gemar et al. | |
| 6,701,399 B1 | 3/2004 | Brown | |
| 2003/0005182 A1 | 1/2003 | Leete et al. | |

FOREIGN PATENT DOCUMENTS

| | | |
|---|---|---|
| JP | 09044443 | 2/1997 |
| WO | WO 00/49507 | 8/2000 |
| WO | WO 01/08018 A1 | 2/2001 |

OTHER PUBLICATIONS

Searched Report for PCT/US 02/01556 mailed Aug. 29, 2002, 1 page.
IEEE Standard for a High Performance Serial Bus; IEEE Std 1394–1995; Aug. 30, 1996; cover pages, pp. 19–47.
U.S. Appl. No. 09/361,677, filed Jul. 27, 1999, John I. Garney et al., noticed.
U.S. Appl. No. 09/362,991, filed Jul. 27, 1999, John I. Garney et al., noticed.
U.S. Appl. No. 09/461,625, filed Dec. 14, 1999, John I. Garney, et al., noticed.
U.S. Appl. No. 09/473,914, filed Dec. 28, 1999, John I. Garney, et al., noticed.
Enhanced Host Controller Interface Specification for Universal Serial Bus dated Nov. 10, 2000, Revision: 0.95; cover pp. —iv and pp. 1–130.
Enhanced Host Controller Interface Specification for Universal Serial Bus dated May 30, 2001, Revision 0.96 rc2, cover pp. —iv and pp. 1–142.

* cited by examiner

*Primary Examiner*—Tammara Peyton
(74) *Attorney, Agent, or Firm*—Blakely, Sokoloff, Taylor & Zafman LLP

(57) ABSTRACT

An apparatus and method for making changes to an active schedule being processed by a host controller is disclosed. The apparatus and method includes examining a transaction descriptor, determining a current state for a transaction based on the transaction descriptor, and preventing the transaction from starting if the current state indicates the transaction has not already started.

12 Claims, 4 Drawing Sheets

APPARATUS AND METHOD TO ALLOW AND SYNCHRONIZE SCHEDULE CHANGES IN A USB ENHANCED HOST CONTROLLER

FIELD OF THE INVENTION

The present invention pertains to the field of data communication in a digital system. More particularly, the present invention relates to host controllers and hubs used to transfer information on a bus.

BACKGROUND OF THE INVENTION

A computer or similar device typically has a bus that connects peripherals to the computing system. Sometimes a hub or multiple hubs may be placed between the peripheral and the computing system (host). A hub provides a fan-out capability by allowing multiple peripherals to be connected to the hub which is in turn connected to the host or a daisy-chain of hubs of which is ultimately connected to the host. Some of the peripherals operate at a high data rate and some operate at a low data rate. Due to a variety of advances (e.g. computing power) in computers (hosts) and peripherals, the data rates at which some peripherals operate have increased significantly. The increase in data rates cannot be met using existing bus standards. For example, the relative difference between the highest data rate peripheral on a bus and the lowest data rate peripheral on a bus has increased to the point that existing solutions for allowing high data rate peripherals and low data rate peripherals to co-exist on the same bus are typically not very efficient. Additionally, existing solutions for allowing hosts to communicate with both advanced, high data rate devices and legacy, low data rate devices usually require the host and/or hub to be relatively complex and costly.

Existing solutions for allowing high data rate peripherals and low data rate peripherals to co-exist on the same bus are typically not very efficient when used for buses whose ratio of the highest data-rate supported on the bus to the lowest data rate supported on the bus is relatively large. Examples of low data rate peripherals include computer mouse devices, and joy-sticks that need to co-exist along with high data-rate peripherals. Examples of relatively high data rate peripherals, include cameras, compact disc players, speakers, video cameras, microphones, video display devices, and scanners among other devices. A mouse typically has a data rate significantly less than 0.1 Mb/s, while a video display device can have a data rate in excess of 20 Mb/s. When the ratio of the highest data rate to the lowest data rate is relatively small, solutions such as speed-shifting and non-multiplexed store-and-forward transactions are tolerable despite their relative inefficiency.

In the well-known Universal Serial Bus (USB), for example, speed-shifting refers to a host communicating at a low-speed with low data rate peripherals and alternatively at full-speed with high data rate devices (speed-shifting). Unfortunately, the amount of data actually transmitted over the bus (effective throughput) is less than that achievable by limiting the bus to full-speed transactions.

Non-multiplexed store and forward transactions occur when a host (1) transmits, at a high data rate, a packet to a store-and-forward hub, (2) waits for the hub to forward at the low data rate the packet to the peripheral, (3) waits for the peripheral to respond at the low data rate to the hub, and (4) receives from the hub at a high data rate the peripheral's response to the packet. When the ratio of the highest data rate supported on the bus to the lowest data rate supported on the bus is relatively large, this co-existence solution may also result in a low effective throughput or bandwidth because of the time wasted in waiting for the hub to forward the packet at the low data rate and for the peripheral to respond at the low data rate.

Accordingly, scheduling time for data sent and received by devices connected to a hub requires that the host controller determine a first estimated unused capacity left in a first frame in which a second transaction is to be performed between a hub and an agent. The host controller then determines an amount of a first data item that can fit into the estimated unused capacity of the frame to be sent to the hub during a first transaction and then sent by the hub to the agent during a second transaction.

Occasionally, after the scheduling is completed and data is being transmitted, additional devices are connected to the bus. Furthermore, previously connected devices may stop operating or need less bandwidth. The connection of new devices and disconnection of connected devices requires that the host controller create a new schedule to allocate the change in bandwidth. The host controller and system software, however, cannot change the schedule while the schedule is still active. If the transaction descriptors (TDs), which carry information regarding the scheduling of the transactions between the host controller, hub, and devices, are changed during an active schedule, then spurious errors may occur in USB device operation. Current solutions for updating and changing the active schedule require that the transaction descriptors be removed from the schedule and updated then returned back into the schedule. Removing the transactions descriptors slows down the overall performance of the system or requires complex software methods.

As described above, existing host controllers are not capable of changing the active schedule of transactions between the system and the devices. Consequently, it is desirable to provide an apparatus and method for allowing changes to be made to an active schedule without removing the transaction descriptors from the active schedule.

BRIEF DESCRIPTION OF THE DRAWINGS

The present invention is illustrated by way of example, and not limitation, in the figures of the accompanying drawings in which like references denote similar elements, and in which.

DETAILED DESCRIPTION OF AN EMBODIMENT OF THE INVENTION

An apparatus and method for allowing and synchronizing schedule changes to an active schedule in a USB Enhanced Host Controller Interface is described. In the following description, for purposes of explanation, numerous specific details are set forth in order to provide a thorough understanding of the present invention. It will be evident, however, to one of ordinary skill in the art that the present invention may be practiced in a variety of bus systems, especially serial buses, without these specific details. In other instances well known operations, steps, functions and devices are not shown in order to avoid obscuring the invention.

Parts of the description will be, presented using terminology commonly employed by those of ordinary skill in the art to convey the substance of their work to others of ordinary skill in the art, such as device or controller drivers, bus or host controllers, hubs, bus agents or agents, and so forth. Also, parts of the description will also be presented in terms of operations performed through the execution of programming instructions or initiating the functionality of some programmable component(s) or electrical component(s) or circuitry, using terms such as, performing, sending, processing, allowing, preventing, examining, determining, scheduling, transmitting, configuring, and so on. As well understood by those of ordinary skill in the art, these operations may take the form of electrical or magnetic or optical signals capable of being stored, transferred, combined, and otherwise manipulated through electrical, optical, and/or magnetic components.

Various operations will be described as multiple discrete steps performed in turn in a manner that is most helpful in understanding the present invention. However, the order of description should not be construed as to imply that these operations are necessarily performed in the order that they are presented, or even order dependent. Lastly, repeated usage of the phrases "in one embodiment," "in an embodiment," "an alternative embodiment," or "an alternate embodiment" does not necessarily refer to the same embodiment, although it may.

Figure 1A:
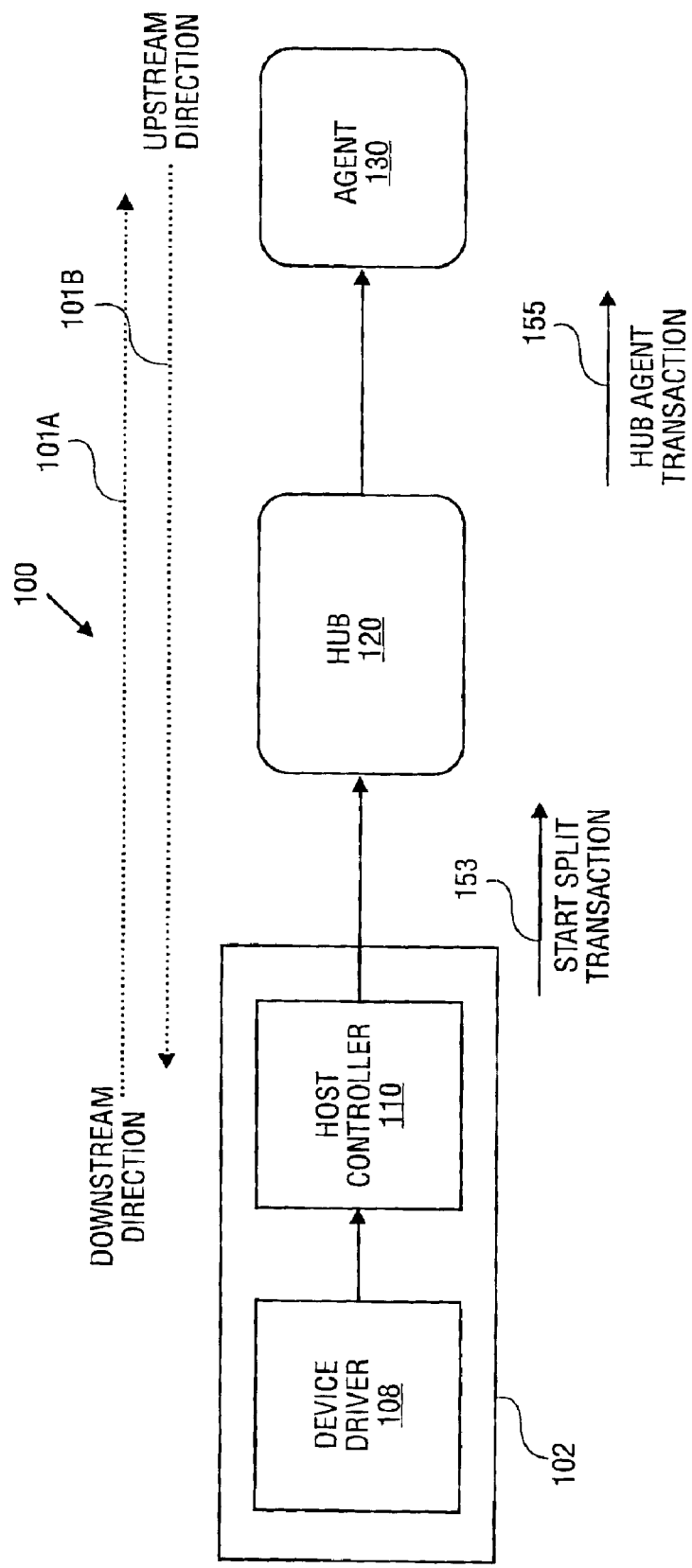
FIG. 1a illustrates a block diagram of a digital system using a protocol in accordance with the present invention.

FIG. 1a illustrates a block diagram of a bus using a protocol in accordance with the present invention. Bus 100 includes a system 102 having a host controller 110 which is coupled to hub 120 which is in turn coupled to agent 130. Host controller 110 has an associated device driver 108 that executes on system 102. Examples of agents include peripheral devices, such as cameras, compact disc players, speakers, microphones, video display devices, scanners, and joysticks and mice, among other devices. System 102 can include any digital system capable of digital communication, especially laptop computers, desktop computers, servers, set-top boxes, entertainment systems, and game machines. Consequently, this invention can be practiced with a variety of digital devices using digital communication.

Two arrows, 101a and 101b, are drawn in FIG. 1a to provide a frame of reference as to the direction of communication among the host, hub and agent. The direction from the agent to the hub and on to the host is referred to as the upstream direction or upstream (in). The direction from the host to the hub and on to the agent is referred to as the downstream direction or downstream (out).

Host controller driver 108 facilitates communications or transactions along bus 100 (e.g., on behalf of an application executing on system 102) by processing packets of information destined for agent 130 and scheduling the packets for transmission by controller 110. Host controller 110 sends data to and receives data from agent 130 via hub 120. Agent 130 typically communicates at a different or lower data rate (agent data rate) than the data rate of host controller 110 (host data rate). While only one agent is shown in FIG. 1a coupled to hub 120, it would be apparent to one of ordinary skill in the art that additional agents (not shown) can be attached to hub 120 or to other connected hubs (not shown). These additional agents may communicate at the host data rate or the agent data rate. Furthermore, while agent 130 is shown in FIG. 1a directly coupled to hub 120, agent 130 may be coupled to hub 120 through at least one conventional repeater type hub that operates at the agent data rate. A conventional repeater type hub repeats signals it receives on its upstream side through to its downstream ports, and vice versa. The conventional repeater type hub may in turn have one or more agents 130 attached to it.

Host controller 110 and agent 130 typically have a master-slave relationship, which means that the host initiates typically all data transactions between the host and an agent; i.e., the agent only responds to requests from the host, but never initiates a transaction. Hub 120 has store-and-forward buffers (not shown) that allow hub 120 to temporarily store downstream information received from host controller 110 and destined for agent 130, and to temporarily store upstream information received from agent 130 and destined for host controller 110.

Because agent 130 and host controller 110 may communicate at different data rates, it is desirable to enhance the effective throughput on the bus 100 by providing a protocol that would allow host controller 110 to both (1) communicate at its higher data rate and (2) not have to wait for responses from agent 130 before engaging in another transaction. The protocol of the present invention allows host controller 110 to take advantage of the store-and-forward characteristic of hub 120 to allow the host controller 110 to communicate at its higher data rate and to engage in another transaction instead of waiting for a response from agent 130, if a response is required. The protocol of the present invention also provides robustness and reliability to transactions performed between controller 110 and hub 120. Additionally, the host controller and/or hub of the present invention allow increased effective throughput on the bus and provide increased responsiveness to agents (not shown) that communicate at the host data rate and that are attached to hub 120 or other hubs.

Figure 1D:
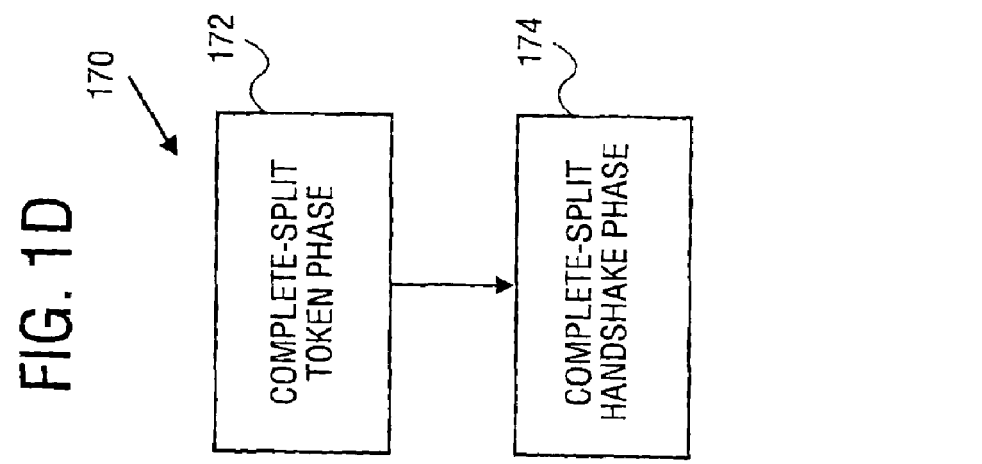
FIGS. 1b–1d each illustrates a process showing a method in accordance with this invention for communicating between a host controller and a hub.
Figure 1C:
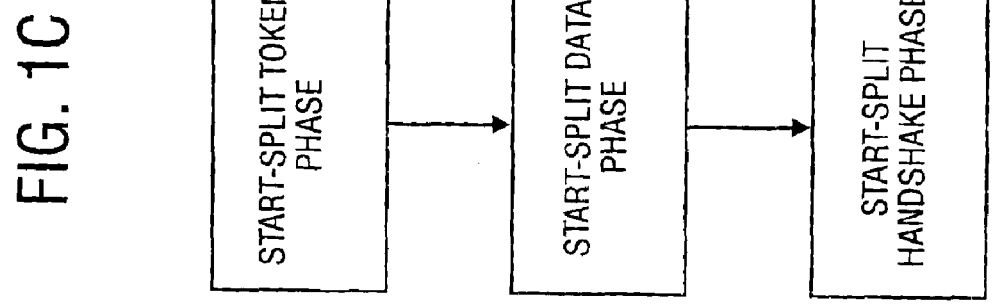
Figure 1B:
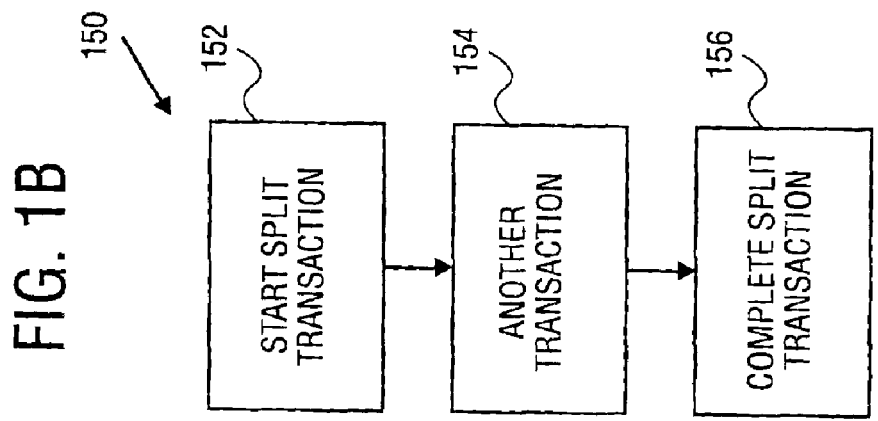

FIG. 1b illustrates a process 150 operable in accordance with the present invention for communicating with an agent having a lower (or different) data rate, than the data rate of a host controller. The agent may also have a different protocol than the host controller. Process 150 can be used to effect a variety of information transfers between host controller 110 and agent 130. For ease of understanding, process 150 will only be described here with regards to a bulk out transfer of data. However, process 150 can be used with other information transfers described below. In a bulk out transfer, data is transferred from host controller 110 to agent 130 via hub 120. The bulk out transfer is defined according to an embodiment of this invention as an asynchronous transfer type. However, it should not be concluded from this definition that any bulk and/or out transfer need be asynchronous.

At step 152 in process 150, a start split transaction operation is performed. The start split transaction communicates downstream information from host controller 110 to hub 120. This operation is also shown in FIG. 1a at line 153. Some of the downstream information communicated to hub 120 is temporarily buffered in hub 120. The buffers in hub 120 largely behave in a conventional first-in-first-out (FIFO) manner, and are described in greater detail below. Some time after the downstream information is buffered, hub 120 performs a hub-agent transaction 155 with agent 130 based on some of the buffered downstream information. The relative timing of the hub-agent transaction need not be described herein, because one of ordinary skill in the art would recognize that this is an application or implementation detail for which there are many possibilities. The hub-agent transaction may result in upstream information being buffered in hub 120. Some time after the downstream information is buffered, at step 156, a complete split transaction operation is performed. The complete split transaction operation communicates buffered upstream information from hub 120 to host controller 110. The relative timing of the complete split transaction operation need not be described herein because one of ordinary skill in the art would recognize that this is an application or implementation detail for which there are many possibilities.

A benefit of the split transaction protocol is that it allows controller 110 to initiate communication (start-split transaction) with agent 130, engage in another function (step 154), or engage in another communication with another agent (low data rate or high data rate agent) at step 154, and then return to complete the communication that was initiated earlier with the low data rate agent. By communicating using split-transactions, controller 110 communicates at high data rates without speed-shifting and does not sit idle while waiting for hub 120 to communicate with agent 130. The time that would have been spent being idle can be used to communicate with another agent. In an alternative embodiment in accordance with the present invention, controller 110 may engage in speed-shifting with some agents while engaging in split-transaction communication with other agents.

The start split and the complete split transactions (split transactions) described above may be used to implement a variety of transfer types (e.g., read or write) for communicating data between controller 110 and agent 130. In an embodiment of this invention, four transfer types (or transfer requests) are defined: bulk out/in, control out/in, interrupt, isochronous. It should be apparent to one of ordinary skill in the art that the scope of this invention includes other embodiments with fewer, more or different transfer types. Each of the transfer types provides different levels of robustness, reliability, synchronization, asynchronous operation, error detection and correction of the communication flow, and other characteristics that should be apparent to one of ordinary skill in the art. For example, bulk out/in provides large asynchronous data transfers from controller 110 to agent 130 or in the opposite direction. Control out/in also provides asynchronous data transfer from controller 110 to agent 130 or in the opposite direction, but the data is typically control information used to control the operation of elements (e.g., a tape drive) in agent 130 or other system. Interrupt provides a periodic data transfer from controller 110 to agent 130 or in the opposite direction. If the transfer is not successful, controller 110 may try again in an embodiment in accordance with this invention. Isochronous transfer provides a data transfer once every predetermined time interval. According to an embodiment of the present invention, the transfer may occur at any time during the time interval. If the transfer is not successful, controller 110 will not repeat the transfer. In an alternative embodiment in accordance with the present invention, the isochronous transfer may provide for repeat transfers.

The split transactions may include a number of phases depending on the transfer type being implemented. Each of the split transactions may have up to three phases in one embodiment of the present invention: token, data, and handshake. However, depending on the transfer being performed, some transactions may have fewer phases. In an embodiment of the present invention, bulk and control can use the same phases in each of their respective split transactions. The phases for each of the transfer types described above are shown in Table 1, below. Presence of an "X" in a cell of the table indicates that the split transaction for the transfer type has the phase indicated at the top of the column in which the cell resides. While in this embodiment the token and data phases are separate for each of the transfer types, in alternative embodiments the token and data phases may be combined. It should be apparent that in alternative embodiments transfer types may have fewer, more, or even different phases than those shown in Table 1 without departing from the scope of the present invention.

TABLE 1

| Transfer Type | Start-Split Transaction | | | Complete-Split Transaction | | |
|---|---|---|---|---|---|---|
| | Token | Data | Handshake | Token | Data | Handshake |
| Bulk-Control Out | X | X | X | X | | X |
| Bulk-Control In | X | | X | X | X | X |
| Interrupt Out | X | X | | X | | X |
| Interrupt In | X | | | X | X | |
| Isochronous Out | X | X | | | | |
| Isochronous In | X | | | X | X | |

FIG. 1c illustrates in greater detail a process 160 showing a start split transaction for a bulk out transfer in accordance with an embodiment of this invention. At step 162, a token packet including hub identification information, agent and endpoint identification information, transfer type, indicator for specifying direction of transfer (in or out), and data rate identification is sent from host controller 110 to hub 120. Hub identification information, and agent and endpoint identification information, and direction are together commonly referred to here as transaction addressing information. The agent identification information identifies the particular agent with which the host is attempting to communicate. The endpoint identification information identifies a particular portion in the agent with which the host is attempting to communicate. Examples of endpoints include: left speaker and right speaker of a speaker hub, or speaker and microphone of telephone handset. The transfer type in the transaction addressing information is not limited to the types described herein (e.g., bulk out, interrupt, isochronous, control), but can include other types known in the art without departing from the scope of this invention. Data rate identification specifies the data rate with which the hub-agent transaction described in connection with process 150 above will be performed. For an embodiment in which the hub-agent transaction is performed in accordance with the USB standard, data rate identification will specify either 12 Mb/s (full-speed) or 1.5 Mb/s (low-speed). It will be apparent that other embodiments may use different data rates. At step 164, a data packet is sent from host controller 110 to hub 120. At step 166, a first acknowledgement is received by host controller 110 from hub 120, if the data packet was decoded properly by hub 120. The first acknowledgement indicates whether the data was decoded properly by hub 120 or whether hub 120 wants to defer the communication to a later date (e.g., hub 120 had full buffers and was not able to accept the data).

FIG. 1d illustrates in greater detail a process 170 showing a complete split transaction for a bulk out transfer in accordance with an embodiment of this invention. At step 172, a second token packet including transaction addressing information is sent from the host 110 to the hub 120. At step 174, a second acknowledgement is received by host controller 110 from hub 120, where the second acknowledgement can either (1) include handshake information received by hub 120 from agent 130 during the hub-agent transaction described above in connection with FIG. 1b or (2) indicate that hub 120 does not yet have information based on the hub-agent transaction to forward to host controller 110 (e.g., the hub-agent transaction has not yet been completed). The handshake information indicates whether (1) agent 130 properly received data during the hub-agent transaction (ACK), (2) agent 130 indicated that it is not able to operate normally (STALL), or (3) agent 130 indicated that it wanted to be tried later (NAK). While the first and second acknowledgements and the handshake information have been described as specifying certain indicators, it should be apparent to one of ordinary skill in the art that these acknowledgements and handshakes and other ones described herein may represent other indications. Additionally, acknowledgements and handshakes different from or additional to the ones described herein may be added in an alternative embodiment without departing from the scope of the invention.

While the above description has generally been presented in the context of agent 130 and hub 120 communicating at a lower data rate than the data rate between hub 120 and host controller 110, those of ordinary skill in the art will appreciate that the present invention may be practiced to bridge a lower data rate to a higher data rate instead, or even equal data rates but different protocols.

While in FIG. 1a only one hub was shown in between the agent and the host there can be multiple hubs between any particular agent and the host. While only six transfer types have been described, those of ordinary skill in the art will appreciate that other types can be used without departing from the scope of this invention.

Figure 1E:
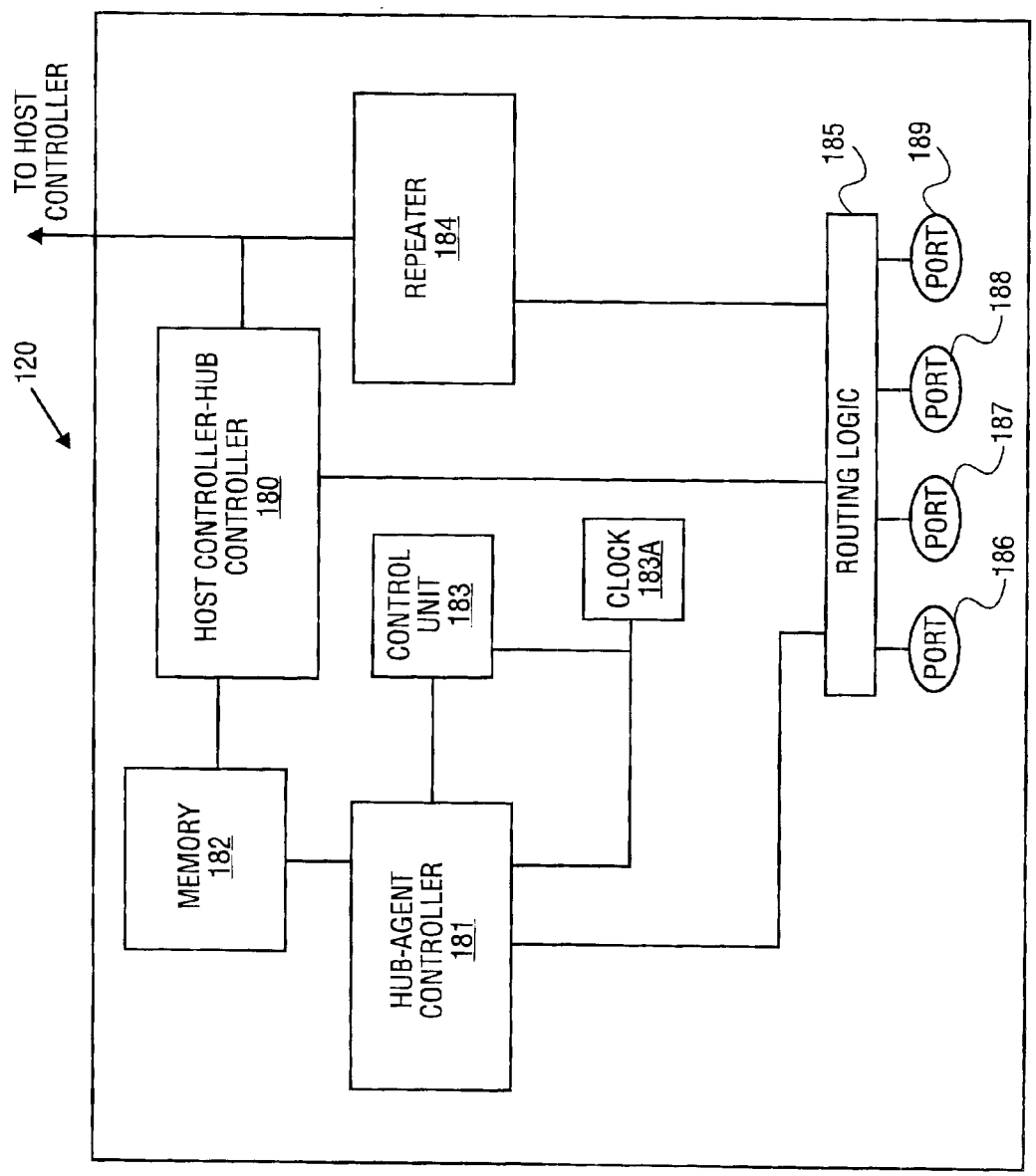
FIG. 1e illustrates a hub in accordance with the present invention.

FIG. 1e illustrates one embodiment of a hub system useful with the present invention. This hub system can be used with the present invention to effect some of the advantages described herein.

As described earlier herein, the host controller uses a schedule to manage data transmissions for devices connected to the bus. The active schedule represents a portion of the host controller schedule specifying status and configuration information for transactions being currently and actively processed on the bus. As described earlier herein, the prior art is unable to efficiently make modifications to the active schedule without introducing spurious errors into USB device operations. As described below, the present invention overcomes this deficiency in the prior art.

Figure 2:
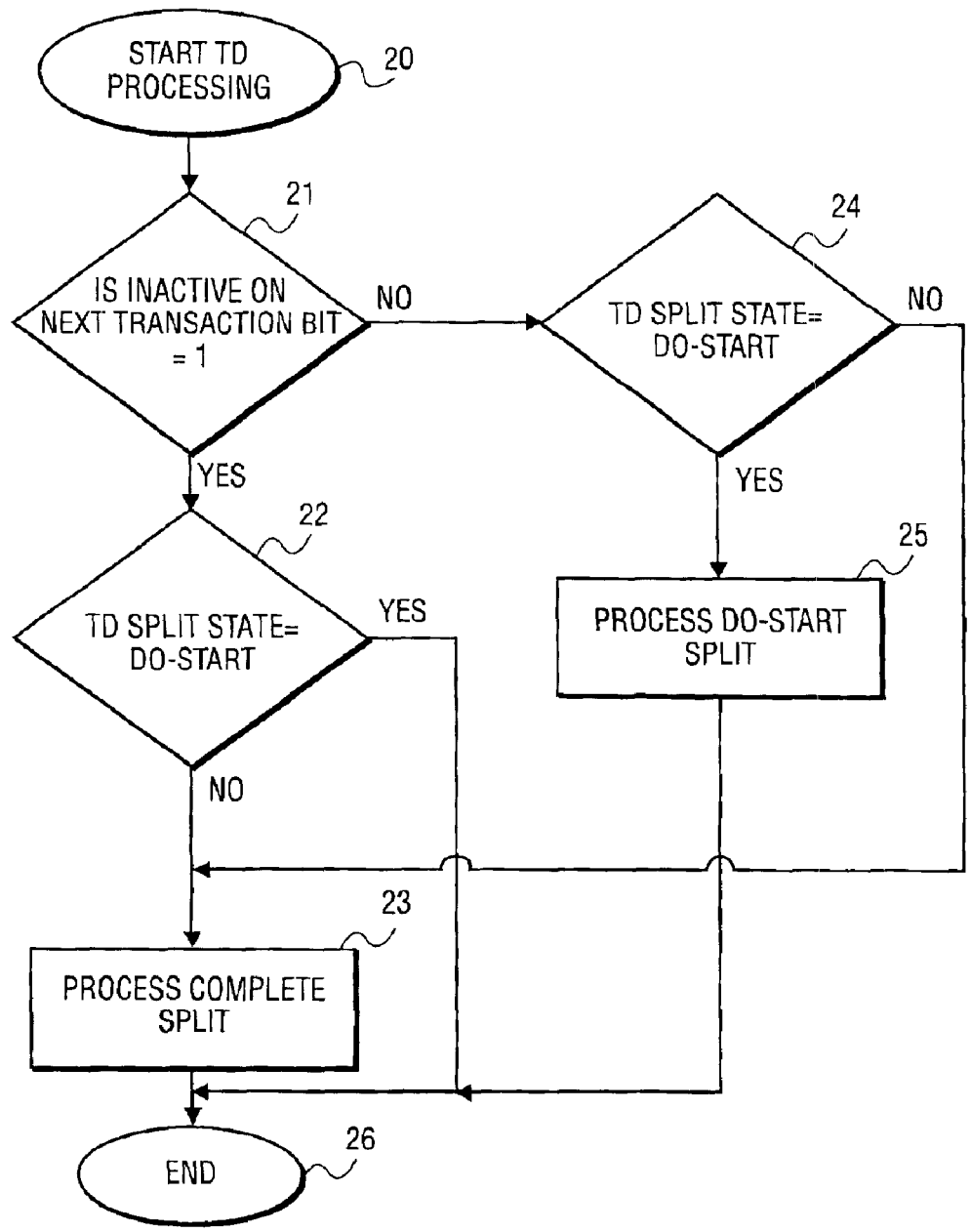
FIG. 2 is a flow chart of an embodiment of a procedure for making changes to an active schedule.

FIG. 2 is a flow diagram illustrating an embodiment of a procedure for making changes to an active schedule. The procedure illustrated in FIG. 2 may be implemented by the host controller as shown in FIG. 1a and/or host controller driver software. At step 21, the host controller determines whether the Inactive on next instruction (I) bit is set to one. The I-bit is set to one by system software to signal the host controller that the software intends to update the queue head of the transaction descriptor. Therefore, if the I-bit is zero (the "No" branch of block 21), the host controller performs normal TD processing. As part of normal TD processing, the host controller processes the Do-Start split (block 25) if the TD split state is Do-Start ("Yes" branch of block 24) or the host controller processes the complete split (block 23) if the TD split state is not Do-Start ("No" branch of block 24).

Referring again to block 21, if the I-bit is one, however, the host controller will continue to block 22 to verify the state of the transaction.

At block 22, the host controller examines the transaction descriptor to determine the split state of the transaction. The host controller examines the split state field of the transaction descriptor so that system software does not update the transaction descriptor in the midst of a split transaction. If the split state is Do-Start ("Yes" branch of block 22), the split transaction has entered a start split state and the host controller advances directly to End bubble 26 where the TD normal processing is bypassed for this cycle. If the split state is Do-Complete ("No" branch at block 22), however, the split transaction has issued a start split and is ready to be processed for completion. At this point, the host controller advances to block 23.

At block 23, because the split transaction has issued a start split, the procedure allows processing to complete the split transaction. Upon completion, processing advances to End bubble 26.

The flowchart illustrated in FIG. 2 shows the basic processing performed by the present invention. However, it will be apparent to one of ordinary skill in the art that the host controller implements the functionality illustrated by this flowchart once each time the host control processing visits a TD (which it will do for each start/complete transaction). In typical operation, a TD can be visited n times for a given split transaction (example: once for start split, and possibly three times for complete splits). Other TD's would get processed in between the given TD being processed (more than once).

In one embodiment the host controller processing (i.e. host controller driver software) can simply set the I-Bit and then delay for a period of time until the host controller has had enough time to finish the last complete split before modifying the TD. In another embodiment, the host controller hardware can provide some kind of handshake mechanism (i.e. a done bit or hardware interrupt) that indicates that the last complete split has finished and the TD will issue another start split until the I bit is cleared. In yet another embodiment, the host controller processing (i.e. host controller driver) can create another TD to assume the processing of the TD that has been inactivated with the I-bit. This approach minimizes the time that the effected transactions would otherwise be exposed to delays in transmission (possibly due to having to synchronize the software with the hardware or for software to otherwise process and re-initialize the inactivated TD).

Thus, an apparatus and method for making changes to an active schedule being processed by a host controller has been described. Although the present invention has been described with reference to specific exemplary embodiments, it will be evident to one of ordinary skill in the art that various modifications and changes may be made to these embodiments without departing from the broader scope the invention as set forth in the claims. Accordingly, the specification and drawings are to be regarded in an illustrative rather than a restrictive sense.

What is claimed is:

1. A method for making changes to an active schedule being processed by a host controller, the method comprising:

examining a transaction descriptor including a control bit to retain information related to a change in the active schedule;

determining a current state for a transaction based on the transaction descriptor;

preventing the transaction from starting if the current state indicates the transaction has not already started and a change in the active schedule is indicated by the control bit; and allowing the transaction to complete if the current state indicates the transaction has already started.

2. The method of claim 1, further including marking the transaction descriptor as inactive.

3. The method of claim 1, wherein the transaction is a split transaction.

4. The method of claim 1, wherein the transaction descriptor includes a queue head, which is updated once the transaction is completed.

5. An apparatus comprising:

a transaction descriptor including a control bit to retain information related to a change in an active schedule; and a host controller, the host controller including, a first programmable component to determine a current state for a transaction based on the transaction descriptor, a second programmable component to prevent the transaction from starting if the current state indicates the transaction has not already started and a change in the active schedule is indicated by the control bit, and a third programmable componet to allow the transaction to complete if the current state indicates the transaction has already started.

6. The apparatus of claim 5, further including a third programmable component to mark the transaction descriptor as inactive.

7. The apparatus of claim 5, wherein the transaction is a split transaction.

8. The apparatus of claim 5, wherein the transaction descriptor includes a queue head, which is updated once the transaction is completed.

9. An system comprising:

a transaction descriptor including a control bit to retain information related to a change in an active schedule;

an agent; and a host controller coupled to the agent, the host controller including, a first programmable component to determine a current state for a transaction based on the transaction descriptor, a second programmable component to prevent the transaction from starting if the current state indicates the transaction has not already started, and a change in the active schedule is indicated by the control bit, and a third programmable componet to allow the transaction to complete if the current state indicates the transaction has already started.

10. The system of claim 9, further including a fourth programmable component to mark the transaction descriptor as inactive.

11. The system of claim 9, wherein the transaction is a split transaction.

12. The system of claim 9, wherein the transaction descriptor includes a queue head, which is updated once the transaction is completed.

* * * * *

UNITED STATES PATENT AND TRADEMARK OFFICE
CERTIFICATE OF CORRECTION

PATENT NO. : 6,889,265 B2  Page 1 of 1
DATED : May 3, 2005
INVENTOR(S) : Garney et al.

It is certified that error appears in the above-identified patent and that said Letters Patent is hereby corrected as shown below:

<u>Column 9,</u>
Line 31, delete "third" and insert -- fourth --.

Signed and Sealed this

Nineteenth Day of July, 2005

JON W. DUDAS
*Director of the United States Patent and Trademark Office*